United States Patent [19]
Hansen

[11] Patent Number: 5,479,261
[45] Date of Patent: Dec. 26, 1995

[54] READOUT SYSTEM FOR DILATOMETERS

[75] Inventor: Gary L. Hansen, Savage, Minn.

[73] Assignee: Honeywell Inc., Minneapolis, Minn.

[21] Appl. No.: 706,686

[22] Filed: May 29, 1991

[51] Int. Cl.$^6$ ............................ G01B 11/28; G01B 11/02
[52] U.S. Cl. .............................. 356/379; 356/357; 374/55
[58] Field of Search ...................................... 356/356, 357, 356/358, 379; 382/8; 374/45, 55, 56

[56] References Cited

U.S. PATENT DOCUMENTS

| | | | |
|---|---|---|---|
| 3,804,527 | 4/1974 | Baughn et al. | 356/379 |
| 4,463,600 | 8/1984 | Hobbs et al. | 356/379 |
| 4,641,971 | 2/1987 | Korth | 356/359 |
| 4,989,980 | 2/1991 | Berg | 356/357 |

Primary Examiner—Hoa Q. Pham
Attorney, Agent, or Firm—Robert A. Pajak; Craig J. Lervick

[57] ABSTRACT

A method and apparatus for calculating the area of an image, including the steps of selecting an image and determining a first radial line segment from the center of the image. The second step is locating at least one local minima along the first radial line segment, the minima being located by measuring the average brightness for a region immediately adjacent to it. The darkest region of the image is followed through a plurality of angles theta covering 360 degrees about the center by finding the local minimum on a ruler which is closest to the local minimum of a radial line segment adjacent to the segment for angle theta −1. The area is determined by summing the areas of individual wedge shaped slices defined by theta and theta −1.

10 Claims, 3 Drawing Sheets

READOUT SYSTEM FOR DILATOMETERS

FIELD OF THE INVENTION

The present invention relates to a readout system, and more particularly to a method and apparatus for calculating changes in the area of images such as Newton rings. One application of the present invention is in the field of dilatometry, where it can be used with a focused beam laser dilatometer system.

BACKGROUND OF THE INVENTION

The field of dilatometry has had a long and untilled need for a cost efficient and accurate dilatometer system, particularly for use in measuring various properties of materials such as quartz, glass, and the like. The coefficient of thermal expansion for these and other materials can be measured using a Fizeau interferometer. In this device, laser light interferes between the test surface and a flat reference surface, creating interference fringes. These fringes, in the shape of concentric rings known as Newton rings change as the temperature of the test material varies. Very small changes in the size of the test material, in the order of one angstrom, become visible.

One particular use to which this technology is applied is physical analysis of a variety of optical glasses. Each glass composition has its own specific set of properties, of course, and various end uses will determine the specific property in which an interest exists.

One of the more important physical characteristics of optical glass is the coefficient of thermal expansion. This property, called CTE, is defined as the amount that the material expands or contracts during a change in temperature.

In this field of optical dilatometry, in which properties are measured very accurately the prior art has emphasized the use of interferometers which employ collimated or parallel light. These systems have significant deficiencies in cost and accuracy. For example, since a reference mark of the viewing screen is used, accuracy of measurements depend on the stability of the interferometer and the test sample with respect to the reference mark on the viewing screen. To develop systems with maximum stability, would be of prohibitive cost.

It has recently been discovered that the CTE of optical glass may be measured accurately using apparatus and a method disclosed in a commonly owned application by Ralph T. Berg, for A METHOD AND APPARATUS FOR MEASURING COEFFICIENT OF THERMAL EXPANSION, now U.S. Pat. No. 4,989,980. The disclosure of this patent is incorporated herein by reference.

The method disclosed in the Berg patent includes the steps of generating an interference pattern defined by Newton rings which are a function of the specific material being examined. The area of at least one Newton ring is measured, and then the magnitude of change is the dimension is determined as a function of changes in area of that Newton ring. When temperature is used to change the dimension, a coefficient of thermal expansion can be calculated. A scale factor is determined which is a function of the difference between the area of a pair of successive Newton rings and of the wavelength of the laser beam.

The CTE calculations are done by following these steps. The area difference (A1–A2) for a predetermined Newton ring is calculated over a corresponding temperature difference (T2–T1). The area is then converted to a test sample length difference by multiplying by a scale factor. If the test sample has a unity length, e.g., a length equal to the unit of measure being used, the CTE is defined by the equation:

$$CTE = \frac{\text{length difference}}{(T2 - T1)}.$$

The scale factor which is used to convert the area differences to a test sample length difference is derived based upon the knowledge that the difference between any two adjacent Newton rings is a constant which is proportional to one half of the wavelength of the laser beam. The scale factor is thus defined by the equation:

$$\text{Scale Factor } K = \frac{1/2 \text{ wavelength}}{\text{Area difference between rings}}.$$

The scale factor K is useful for calculating length differences by the equation:

$$\text{Length difference} = K \text{ (area at } T2 - \text{area at } T1).$$

As can be seen, the measurement of the area of the Newton rings is most difficult to measure precisely. These rings are not perfect circles with easy to measure areas. In the Berg patent, successful measurements were made by hand. Even when video camera images of the Newton rings were taken, so that precise measurement could be done at leisure, measurement of the area has not been easy or error free. There are means to measure the area of enclosed curves, but these methods are not well suited to Newton ring measurement, particularly when derived as shown in the Berg patent.

Video images of the Newton rings which have been created by interference of laser light between a test surface and a flat reference surface are often weak, just as the rings themselves are weak. In some instances, calculations for one single test has taken up to eight hours of time. It becomes a laborious process of manual data reduction as measurements are taken from a video monitor using the best available measuring equipment.

Development of an algorithm by which the area of a circle could be measured has not met with success. Efforts to locate the center of the circle were made difficult because of variations in instrument hardware. More importantly, precision measurement in the order of 1/10 part per million is sought, and algorithms based on the true or exact center of a circle will produce error since fringes from these Newton rings are not in fact true circles.

Other methods which have failed are those where the edge of the circle is followed. In this case, the algorithm fails when the edge does not return to the starting point, since these are not continuous rings. It should be noted that a fringe or Newton ring is rejected not because it is out of round but because it is discontinuous.

Accordingly, it would be a great advantage in the art to provide a method and apparatus for measuring the areas of Newton rings and other images and the like. It is also desirable to provide a method and apparatus which operates in cooperation with images on video screens. A great improvement in CTE measurement would be achieved if it were possible to substantially shorten the time needed to process data from a dilatometer and permit extremely accurate calculation of CTE and other physical information.

SUMMARY OF THE INVENTION

The present invention provides a method for calculating the area of an image, such as Newton rings which are produced by laser beam interference on a test sample. The method, and the apparatus to accomplish the method of this invention, includes a plurality of steps which permit computer operation to automate the procedure. Video images of Newton rings or fringes are taken, such as at various temperatures or under other induced conditions which might be varied to produce change. The area of the fringe or fringes is determined using a computer implemented algorithm for processing a digital representation of the video image.

An image is acquired from the analog output of an imaging device, such as a video camera (either digital or analog output, but generally being analog), in real time, or alternately from video images stored on a video tape or any other storage medium (e.g. a charge-coupled device array). The image contrasts may be enhanced by as much as a factor of two or more. One specific image is selected, and a first radial line segment extending from the center of that selected image to the selected ring is determined. This radial line segment or "ruler" is similar to a radius of a true circle or ring. At least one local minima coinciding with the selected ring is located along the first radial line segment or ruler. While traversing the ruler, the average brightness for a selected image window or region immediately adjacent to the minima is used in order to reduce the effects of poor image definition. These image windows or regions are known as "boxes" in the image processing industry, in part because they are derived from grids on video screens.

For each of the local minima, the darkest region of said image is followed through a plurality of angles theta covering a full 360 degrees about the center. This is done by finding the local minimum on a ruler or radial line segment which is closest to the local minimum of a radial line segment of the same ring and adjacent to the radial line segment for angle theta −1. It is noted that the curve does not have to be a true circle, as most Newton rings have at least some "out of roundness."

If a local minimum for theta is not found immediately adjacent to the local minimum for the adjacent theta −1, the previous numerical value of the distance from center of the radial line segment for that local minimum at angle theta is used. This permits the method and apparatus to operate even when the fringe is difficult to read or does not comprise a fully continuous circle. If the movement of theta does not return to the starting point, however, the fringe is deemed to be unreadable and it is rejected.

Once the coordinates are known for the particular fringe image, it is necessary to determine the area of the fringe. This is done by summing the areas of individual wedge shaped slices defined by theta and theta −1. The area can be summed over the 360 degrees by calculating the area in a straightforward manner. If measurements are taken at whole degree intervals, it is simple to calculate the area by using the tangent of one-half degree times the radial line segment length for 360 radial line segments.

The resulting data are then transported to a graphics or statistics software package, for example, where the data are displayed and analyzed.

If the invention is to be used for calculating the CTE of a material from an image derived from Newton rings generated from laser interference on the material, the method and apparatus of the previously referenced Berg U.S. Pat. No. 4,989,980 can be used. In that calculation, the area is multiplied by a scale factor K defined by the equation:

$$\text{Scale Factor } K = \frac{1/2 \text{ wavelength}}{\text{Area difference between rings}}$$

to produce a length difference for two temperatures T1 and T2 for a given sample length L. It is then straightforward to calculate the CTE as previously shown, using the equation:

$$CTE = \frac{\text{length difference}}{(T2 - T1)}.$$

The scale factor K is useful for calculating length differences by the equation:

Length difference=$K$ (area at $T2$–area at $T1$).

While the difference in areas between adjacent fringes is used to calculate the scale factor, K, once the scale factor K is found, it need not be recalculated. In this embodiment, the difference in areas of the same fringe at different temperatures is used, such as to calculate the CTE of a material.

BRIEF DESCRIPTION OF THE DRAWINGS

For a more complete understanding of the invention, reference is hereby made to the drawings, in which.

DETAILED DESCRIPTION OF THE PREFERRED EMBODIMENT

As is noted in the Figures, Newton rings thus produced are not perfect circles and have some thickness. The invention is related directly with finding a center and periphery of a ring or other closed shape such as a circle or an oval. The center and the periphery are both located by a computer processing image information of small regions of the image for a determination of the average brightness of each of these small regions. In turn, based on the average brightness of each of these small regions, the location of the center and ring periphery may be determined.

Figure 1:
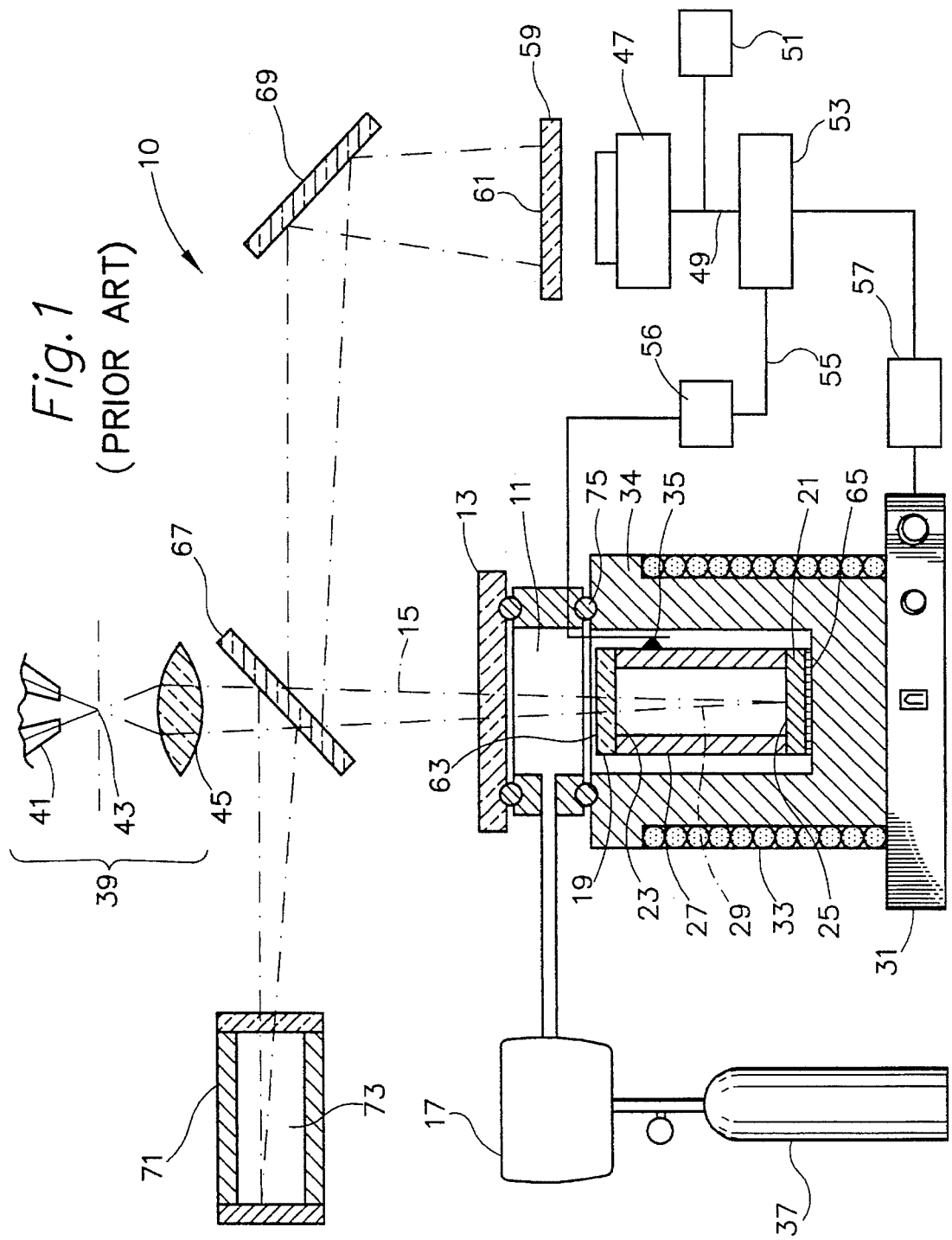
FIG. 1 illustrates a schematic view of a prior art system where the invention is to be used, such as shown in the Berg patent.

In FIG. 1, a schematic view of the present invention is shown in use with a dilatometer readout system. It is intended that the present invention be understood as being useful with dilatometry, although it is also useful in other instances where measuring really small linear distances is desired. For example, the invention may be used in order to get the most accurate description of the shape of an object at a really small scale, such as 1/10 part per million units of length. Measurements of one angstrom change in length has not been easy or inexpensive until the present invention.

Shown in FIG. 1 is an optical dilatometer system 10 which employs a Fizeau interferometer in combination with a focused laser beam 15 to generate an interference pattern 61. The system 10 includes an interferometer having a chamber 11 which includes transparent end 13 for receiving beam 15 into chamber 11. O ring seals 75 provide an airtight seal so that pump 17 can maintain a vacuum within chamber 11.

The temperature within chamber 11 may be varied by many means. Shown in FIG. 1 is a heat source 31 used with liquid nitrogen coils 33 acting on a substantial mass 34. Mass 34 is, for example, a 30 pound mass of copper which functions as a heat reservoir.

System 10 also includes a helium source 37 in order to introduce helium into chamber 11 between uses of the system in order to enhance thermo-conductivity within the chamber 11 and thereby expedite a temperature change in preparation for taking measurements. Of course, once the desired temperature is reached, the helium is then pumped out of the chamber 11, returning to a vacuum state for operation of the system.

A test sample 27 is enclosed in a chamber structure between first and second interference surfaces 23 and 25, which are surfaces of first and second plates 19 and 21. Surfaces 23 and 25 have a flatness within one-twentieth of the laser beam wavelength. For example, for a helium neon laser, the wavelength equals 6328 angstroms. Also according to the preferred embodiment, the surfaces of transparent end 13 should have a flatness within one-quarter of the laser beam wavelength. Transparent end 13 is slightly tilted and is not parallel with first and second interference surfaces 23 and 25 as is non-interfering surface 63 of plate 19. This is done to avoid interference with Newton ring interference patterns which are generated by the system. In addition, surface 65 of plate 21 is also designed to be non-interfering, by sand blasting or forming it from a ground surface.

It is recognized that optical dilatometer systems operate at high temperatures, such as 1000 degrees Fahrenheit. End 13 and plates 19 and 21 should be made of a material having a high melting point, such as ceramicized glass or quartz.

Focused laser beam 15 generates an interference pattern 61 when a focused laser beam system 39 generates the beam 15. System 39 includes a laser 41, an aperture 43 having an aperture width, and a lens 45 having a focal length. The focal length of lens 45 should be at least two orders of magnitude greater than the aperture width, and preferably at least 100 times greater. This is commonly referred to as having an F-number greater than 100.

All of the interferomic sensing is performed on the test sample 27 within chamber 11, and all of the readout is performed outside chamber 11 which is generally at room temperature. The Temperature of sample 27 is measured via temperature sensor 35 having temperature readout 56, and data is sent via line 55 to the computer 53. Also, the ring pattern 61 is viewed on viewing screen 59 to provide the pattern on which the present invention is practiced. This ring pattern 61 is produced on screen 59 and is converted by video camera 47 into digital data, and transmitted via line 49 to VCR 51 and computer 53.

Pattern 61 is transmitted to viewing screen 59 by directing the interference pattern from beam splitter 67 and folding mirror 69. Stabilizing monitor 71 is shown as a means for monitoring the stability of the laser. This is to ensure that the laser emits a constant wavelength and to ensure dimensional stability of the laser. Chamber 75 is thus a similar chamber to chamber 11.

Figure 2:
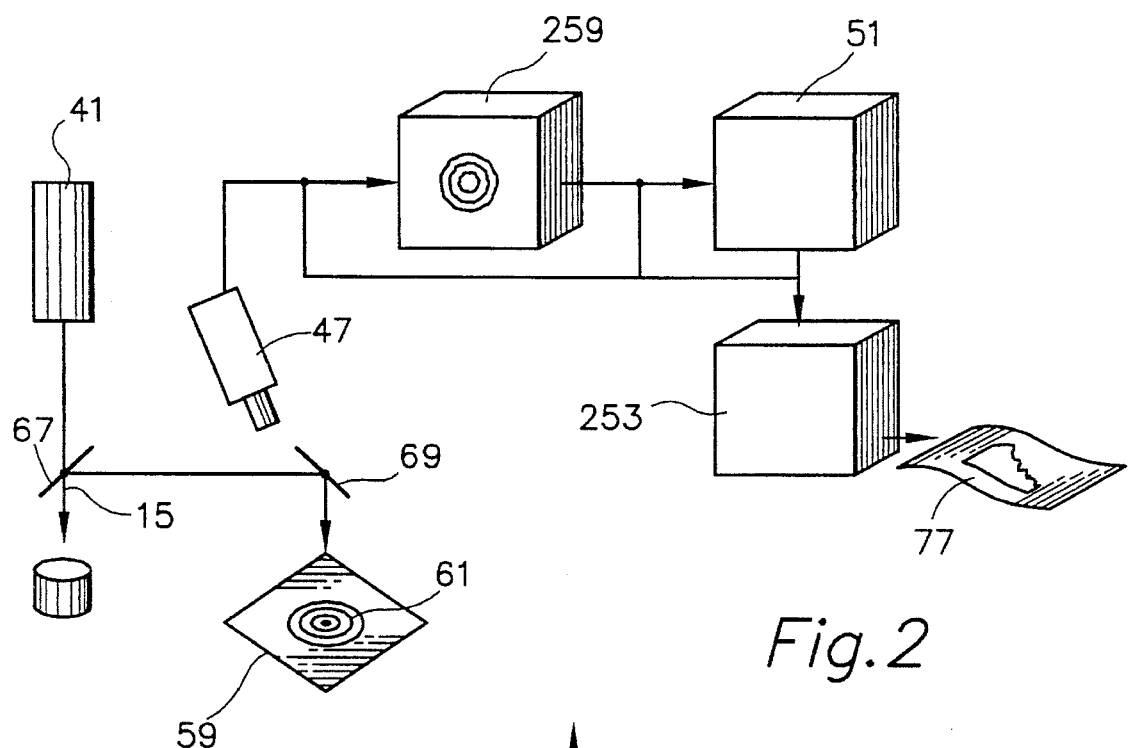
FIG. 2 is a schematic view showing the system of the present invention, used with the dilatometer of FIG. 1, in which components including the video camera and the computer are schematically shown.

The system shown in FIG. 2 is functionally similar to the more detailed system of FIG. 1, but shows the schematic steps for transferring Newton ring data to a screen 59, and translating the ring data into information which can be used in the calculation of desired final information. Simply shown, the laser 41 impacts on the sample 27, and the interference pattern in the form of Newton rings is transmitted from beam splitter 67 and folding mirror 69 to display Newton ring interference pattern 61 on viewing screen 59. Image 61 constitutes a plurality of Newton rings as described in the Berg patent referenced above.

An imaging device 47 such as a video camera captures the image of the Newton rings and displays them on video screen or monitor 259, or alternatively, the images may be recorded on video film or tape by video image storing device 251, such as a video recorder (VCR) or by other image recording means. At the appropriate time, the video film can be viewed and processed by computer 253, similar to computer 53 of FIG. 1, to calculate, for example, the CTE of the material. The present invention is designed to operate in real time, however, because it is so simple and easy compared to prior art methods. Thus, processing of the video image of the Newton rings to obtain the necessary measurements and calculations can be quickly and easily made at the time the data is being derived. This is, of course, a major advantage in production processes and is possible for the first time as a result of the present invention.

The image on viewing screen 59 is observed by imaging device 47, and the image data output is processed by an image processor included in computer 253 as will be described. Image data is fed to computer 253 which may either display or print out CTE data 77 as shown.

Figure 3:
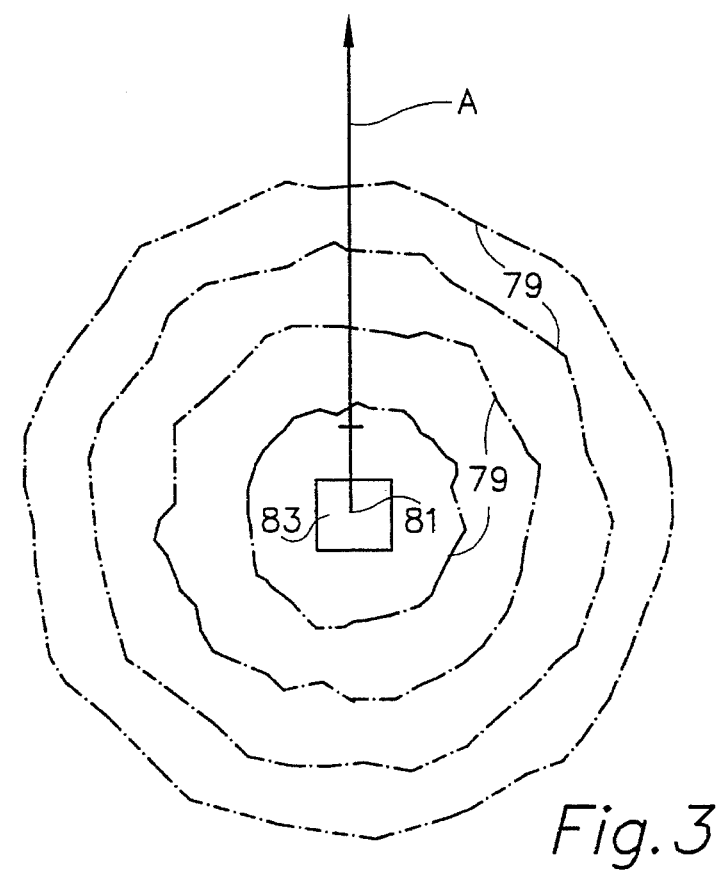
FIG. 3 is a schematic illustration of one series of Newton rings produced by the system of FIG. 1, which are represented by a plurality of rings.

Turning now to FIG. 3, a series of Newton rings 79 are shown as would be viewed on viewing screen 59. The center 81 of the ring is determined by measurement of the average brightness within a small box or window 83. The terms image "window" and image "box" are interchangeable, as they are both descriptive words used in some instances to describe what is inside one or a small number of pixels.

Depending upon the size of the pixels, or small discrete elements that together constitute the image on the display screen, a small area is selected. The pixels are arbitrary screen elements and it is necessary to select an area large enough to average out noise and small enough to average in fringe areas. A tighter fringe or ring needs tighter control over the size of the area selected to be inside the image window.

Sometimes, the image from the video image from either imaging device 47 or video image storing device 251 is enhanced by a factor of two, or more, in order to operate on a clearer ring. Too much enhancement increases noise and distortion, however, and should be avoided. The window 83 is a compromise, being small enough not to loose information and large enough to loose noise.

Figure 4:
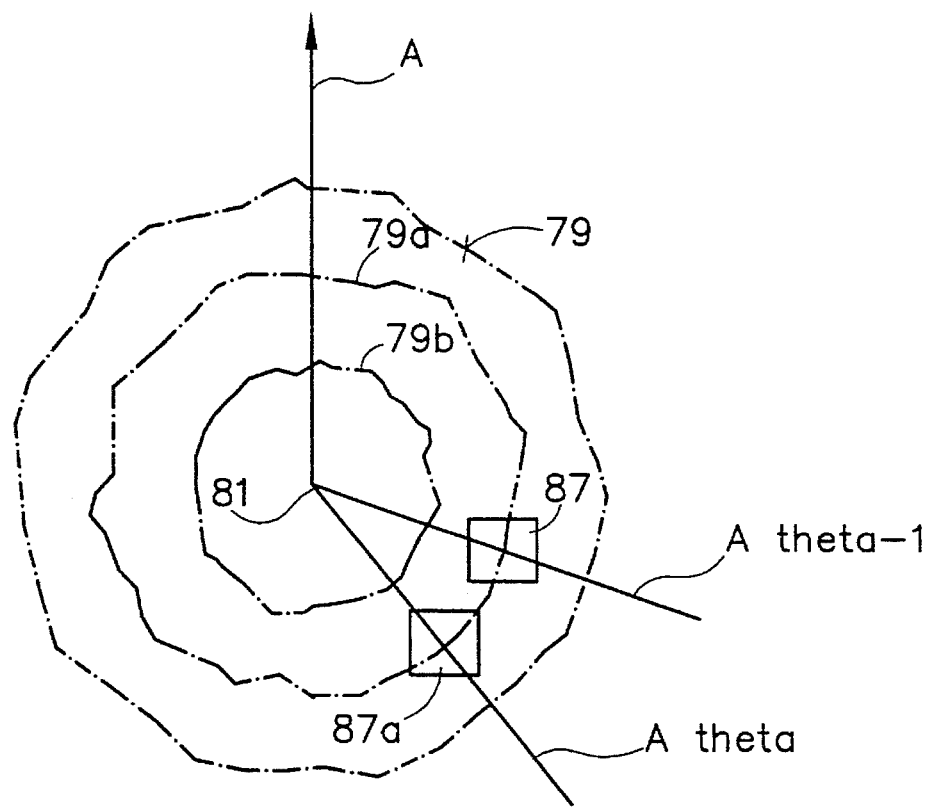
FIG. 4 is a schematic illustration of the present invention as applied to various angles theta about the center of the series of Newton rings shown in FIG. 3, and illustrates how the radial line segment is rotated about 360 degrees, returning to the starting point.

Each ring 79 is seen on viewing screen 59 as a darker area compared to adjacent areas. A first radial line segment or ruler A is selected, from which the first angle theta is measured. Image windows are processed along the radial line segment in order to find local minimum 87 or 87a on ring 79a as illustrated in FIG. 4. Theta is the angle of displacement from one radial line segment to an adjacent line segment. For example, if theta is one degree, there will be 360 angular displacements to complete one full measurement of a selected ring 79. Ideally, with a perfect geometric circle, the radial line segment is the diameter of that perfect circle and the area of each segment is the same as the adjacent segment area.

In real terms, the length of the line segment will vary in relation to the observed ring 79 as the radial line segment is traversed about 360 degrees. The darkest region of ring 79 is determined through 360 degrees about the center 81 by incremental rotation of the radial line segment. The average brightness of the scanned image windows along the radial line segment is determined and the location thereof is noted or processed such that the location of the image window having the "lowest" average brightness is determined. In turn, the total area of the ring is then determined from the sum of wedge-like areas defined by the local minima and the center 81 as will be described.

Determination of each of the local minima on each ring 79 is accomplished, as shown in FIG. 4, by finding the image windows 87, 87a, etc. on radial line segments for various angles theta, theta −1, theta −2 etc., for the entire 360 degrees of ring 79a beginning with first radial line segment A and traversing the entire ring 79a. Local minima 87, 87a, on the rings are shown for A at angle theta and A at angle theta −1. If a local minimum e.g., 87 for theta is not found close to the local minimum for angle theta −1, it is necessary to use the value of the previous local minimum for angle theta. This substitution will accommodate fringes which do not comprise an unbroken or solid circle, but which have clear definition of the fringe for the most part. If a particular fringe is incomplete and does not meet its starting point, it is rejected as a spurious fringe. As each measurement is taken, the polar coordinates are stored for every data point for each fringe.

Figure 5:
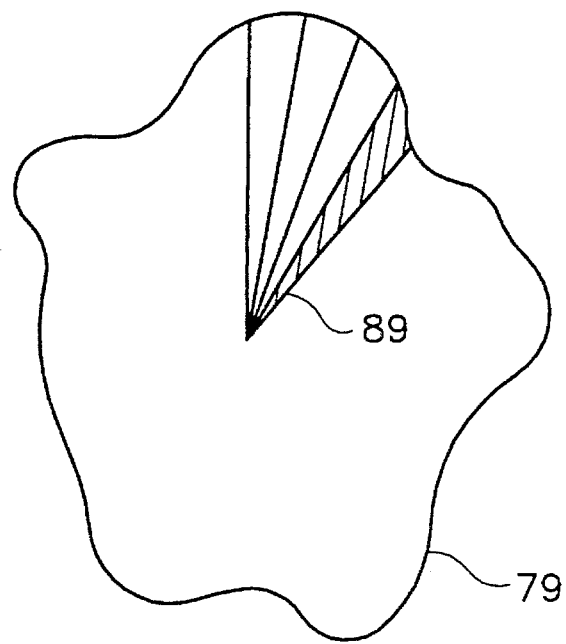
FIG. 5 is a schematic view showing a method of calculating the areas as measured in FIG. 4.

The area within each ring 79 can now be determined by summing the areas of the individual wedge shaped slices 89 of the circle or ring 79 as shown in FIG. 5. This is done by summing the areas between radial line segments between angles theta and theta −1 for the complete ring 79. The areas are determined by geometry by simply knowing the location of the center 81 and the location of a known adjacent pair of local minima 87 on ring 79, for example, local minima locations 87 and 87a shown in FIG. 4. As has been noted, the ring may not be a true circle, and often will have an oval or "out of round" shape. It is not discarded as long as the ring returns to the starting ruler from which the measurements began.

When the information is derived from a dilatometer, such equations can be easily derived by subtracting the areas of two adjacent rings using the device shown in FIG. 1, for example. The calculations are made using the scale factor and equations as described in Berg U.S. Pat. No. 4,989,980 as discussed above. The fringe areas are converted to length L and delta L over L using the equations previously described. The resulting data can be transported to a graphics/statistics software package, where it is displayed and analyzed.

The advantage of using the wedge shape areas is that sometimes, if not every time, the image placed on the screen is slightly off or tilted. Alignment of the camera is done visually, and errors can be incorporated by manual or visual alignment. Thus, the rings are not perfectly round but have a slight tilt. The rings are uniform but slightly oval. Use of the pie shaped wedge of FIG. 5 compensates for the slight tilt of the rings and also compensates for real but discontinuous images.

The present invention is useful for measuring changes in ring size, whether the ring changes are intended to measure index of refraction or change in length with temperature. Similarly, the images produced may be from other forms of microscopy. For example, there is great interest in what the surface of an optical device looks like under very high magnification. It is desirable to characterize optical surfaces for surface roughness. The present invention is useful in this manner to measure or chart the shape of a surface at a really small scale, as it is in any use for measuring really small linear distances.

It should be noted that the images may be stored electronically using a wide variety of techniques. For example, charge-coupled device arrays and signal process the "visual" image so that it is analyzed by only electronic processing. This is possible in surface mapping, for example.

While particular embodiments of the present invention have been illustrated and described, it is not intended to limit the invention, except as defined by the following claims.

I claim:

1. An apparatus for determining the area of at least one image shape represented by 2-dimensional image data, wherein said image shape is bounded by substantially a continuous ring defining region surrounding an image center, said apparatus comprising:

imaging means for providing image data representative of an image including said image shape; and computer means for processing said image data, said computer means operative for,
   (i) obtaining brightness information representative of the brightness of said image along a plurality of radial line segments passing substantially through said image center, and in which adjacent pairs of said plurality of radial line segments are separated by a known angle therebetween, and wherein said brightness information represents the average brightness of a selected image window sampled along each of said radial line segments,
   (ii) processing said brightness information for locating the position of a local minima on said plurality of radial line segments, and where each of said local minima lie on said ring defining region surrounding said image center,
   (iii) determining the area of all successive wedge-shaped areas contiguously surrounding said image center, and in which each of said wedge-shaped areas is defined by the triangular area in which the vertices thereof are the positions of said local minima on adjacent ones of said radial line segments and said image center, and
   (iv) summing means for summing said areas of individual wedge-shaped areas to provide said area of said image.

2. The apparatus of claim 1, wherein the area for the same image is measured at different induced conditions.

3. The apparatus of claim 1, wherein said image means provides the image of at least two adjacent images, and said local minima are located to determine the area of said two adjacent rings.

4. The apparatus of claim 1, wherein said ring is a Newton ring generated from laser beam interference observed on a viewing screen.

5. The apparatus of claim 4, wherein the area is used to calculate the CTE of the material.

6. The apparatus of claim 5, wherein the temperature of said material is varied form a first temperature to a second temperature, and at least two adjacent images are located to determine the area of said two adjacent images at both of said first and said second temperatures.

7. The apparatus of claim 1 wherein said image is produced by laser beam interference observed on a viewing screen.

8. The apparatus of claim 7, wherein said computer means converts said images into cartesian coordinate digital information.

9. The apparatus of claim 8, wherein said computer means includes means for receiving temperature data from said image and for computing the coefficient of thermal expansion of said material.

10. The apparatus of claim 1, wherein said image is derived from an optical surface, and said computer means includes means for computing the surface roughness of said surface.

* * * * *